US006915313B2

(12) United States Patent
Yao

(10) Patent No.: US 6,915,313 B2
(45) Date of Patent: Jul. 5, 2005

(54) DEPLOYING PREDEFINED DATA WAREHOUSE PROCESS MODELS

(75) Inventor: Albert Zhongxing Yao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 10/006,078

(22) Filed: Dec. 6, 2001

(65) Prior Publication Data

US 2003/0110175 A1 Jun. 12, 2003

(51) Int. Cl.[7] .............................................. G06F 17/30
(52) U.S. Cl. ............................... 707/203; 707/4; 704/2
(58) Field of Search ..................... 707/1–10, 100–104.1, 707/200–205; 704/2

(56) References Cited

U.S. PATENT DOCUMENTS 5,692,181 A * 11/1997 Anand et al. ................ 707/102
6,003,039 A * 12/1999 Barry et al. ............. 707/103 R
6,167,405 A * 12/2000 Rosensteel et al. ......... 707/102

* cited by examiner

Primary Examiner—Mohammad Ali
(74) Attorney, Agent, or Firm—John R. Biggers; Mark S. Walker; Biggers & Chanian, LLP

(57) ABSTRACT

Exemplary embodiments typically include methods of deploying a predefined data warehouse process model from a development system having a development environment to a customer system having a customer environment, the customer environment being different from the development environment. Embodiments typically include exporting metadata from the predefined warehouse process model to an interchange metadata file, in which the metadata comprises data elements describing a development environment, in which the metadata comprises at least some data elements having values that are site dependent, and copying, from the interchange metadata file to an interchange resource file, site dependent data elements. Embodiments typically include identifying site dependent data values of the customer system, converting in the interchange metadata file, the site dependent data element values to the site dependent data values of the customer system, and importing the interchange metadata file into the customer system.

16 Claims, 2 Drawing Sheets

US 6,915,313 B2

DEPLOYING PREDEFINED DATA WAREHOUSE PROCESS MODELS

BACKGROUND OF THE INVENTION

1. Field of the Invention

The field of the invention is data processing, or, more specifically, methods, systems, and products for deploying predefined data warehouse process models.

2. Description of Related Art

To deploy predefined warehouse models to installation sites other than their development sites, such as customer sites, data warehouse systems in prior art often export a set of predefined warehouse models in an interchangeable format such as a file formatted by use of a tag language. IBM's DB2 Data Warehouse Center ("DWC"), for example, exports a set of predefined warehouse models in an interchangeable format file formatted by such a tag language. In the example of the DWC, the tag language is the IBM Information Catalog tag language, an example of which is set forth in Appendix I. Another example of an interchangeable file format implemented in a tag language is the format of the Common Warehouse Model ("CWM"), an example of which is set forth in Appendix II. The exported interchangeable format file, which is generally referred to in this specification as an "interchange metadata file," is imported in prior art more or less directly into a new warehouse control database in a new site such as a customer site. If the new site has the same environment as the computer which used to build the exported warehouse models, the new system can be set up and run with few problems.

The conventional approach to deployment of predefined warehouse models, however, does not work very well when elements of the models to be deployed are site dependent, that is, when some elements must vary from development site to a new site such as a customer site. Data warehouse applications usually define a set of data sources from which to extract data and a set of data targets for receiving data. These data sources and targets are usually sets of tables defined in different databases. The warehouse metadata generally captures or models the formats of the data sources and targets including the environment parameters of the development environment, whereas the data warehouse extraction processes were built in the development environment itself. When warehouse metadata is exported to an interchange metadata file, the information describing the transformation needed from the source to the target is captured or modeled there along with the default values of the development environment parameters.

Even in a deployment in which the same sets of tables exist in both data source and data target databases, these set of tables can be created with different users. In addition, the tables in source and target databases may be created using default table schema different from the development environment. Warehouse queries usually contain a full name for the database tables (i.e., schema.table_name) and database column names (i.e., schema.table_name.column_name). The interchange metadata file will retain the same representation of queries as they were generated in the development environment. For the customer site with different table schema, the predefined warehouse queries will not work in the new environment.

Customer databases may use database names different from the database names in the development environment, and the customer database maybe managed by different users. These kinds of information are embedded in the metadata and therefore in the interchange metadata file. Interchange metadata files bearing such incompatibilities will not be directly importable into the customer's environment.

In addition to the site dependent data elements mentioned, customer sites often use languages different from the language in which a data warehouse model was developed. For deploying the predefined warehouse process model to a customer site using a different language environment, warehouse products such as DB2 Data Warehouse Center translate certain default names such as 'Default DWC User' & 'Default Security Group' into different languages in the corresponding language version of the product. A predefined warehouse script in the default development environment, such as en_US, for example, cannot be imported properly into a warehouse control database in another language environment. In addition, in deploying a warehouse process model to an environment with a different language, the entries displayed to the customers need to be translated to the second language, such as, the process name, process step names, and so on. However, most translation tools do not support typical prior art interchange metadata file formats such as the tag file arrangement used in the DB2 Data Warehouse Center. In addition to all the other deployment problems in prior art, it is also true that the size of typical metadata interchange files is very large and therefore challenging to conversion and translation. There is an ongoing need in the art, therefore, for improved methods and means for converting and translating site dependent data elements and language dependent data elements in interchange metadata files for deployment of data warehouse process models.

SUMMARY OF THE INVENTION

Exemplary embodiments of the invention include methods of deploying a predefined data warehouse process model from a development system, the development system having a development environment to a customer system, the customer system having a customer environment, and the customer environment being different from the development environment. Embodiments of the invention typically include exporting metadata from the predefined warehouse process model to an interchange metadata file, in which the metadata includes data elements describing a development environment, in which the metadata includes at least some data elements having values that are site dependent. Some embodiments typically include copying, from the interchange metadata file to an interchange resource file, site dependent data elements, and identifying site dependent data values of the customer system. Other embodiments typically include converting, in the interchange metadata file, the site dependent data element values to the site dependent data values of the customer system, and importing the interchange metadata file into the customer system.

Exemplary embodiments of the invention include identifying site dependent data elements in which the site dependent data elements typically include language dependent data elements, and identifying site dependent data elements includes identifying language dependent data elements. Embodiments typically include building the predefined warehouse process model with unique names for site dependent data elements and with unique names for databases, database users, and table schemas. In some embodiments, copying, from the interchange metadata file to an interchange resource file, site dependent data elements typically includes copying, from the interchange metadata file into a translation resource file, language dependent data elements. Exemplary embodiments include translating the language dependent data elements into one or more customer languages and recording the translations in related fields in the translation resource file. In exemplary embodiments, identifying site dependent data values of the customer system typically includes identifying a customer language of the customer system, and converting, in the interchange metadata file, the site dependent data element values to the site dependent data values of the customer system includes converting language dependent data elements to the customer language of the customer site.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
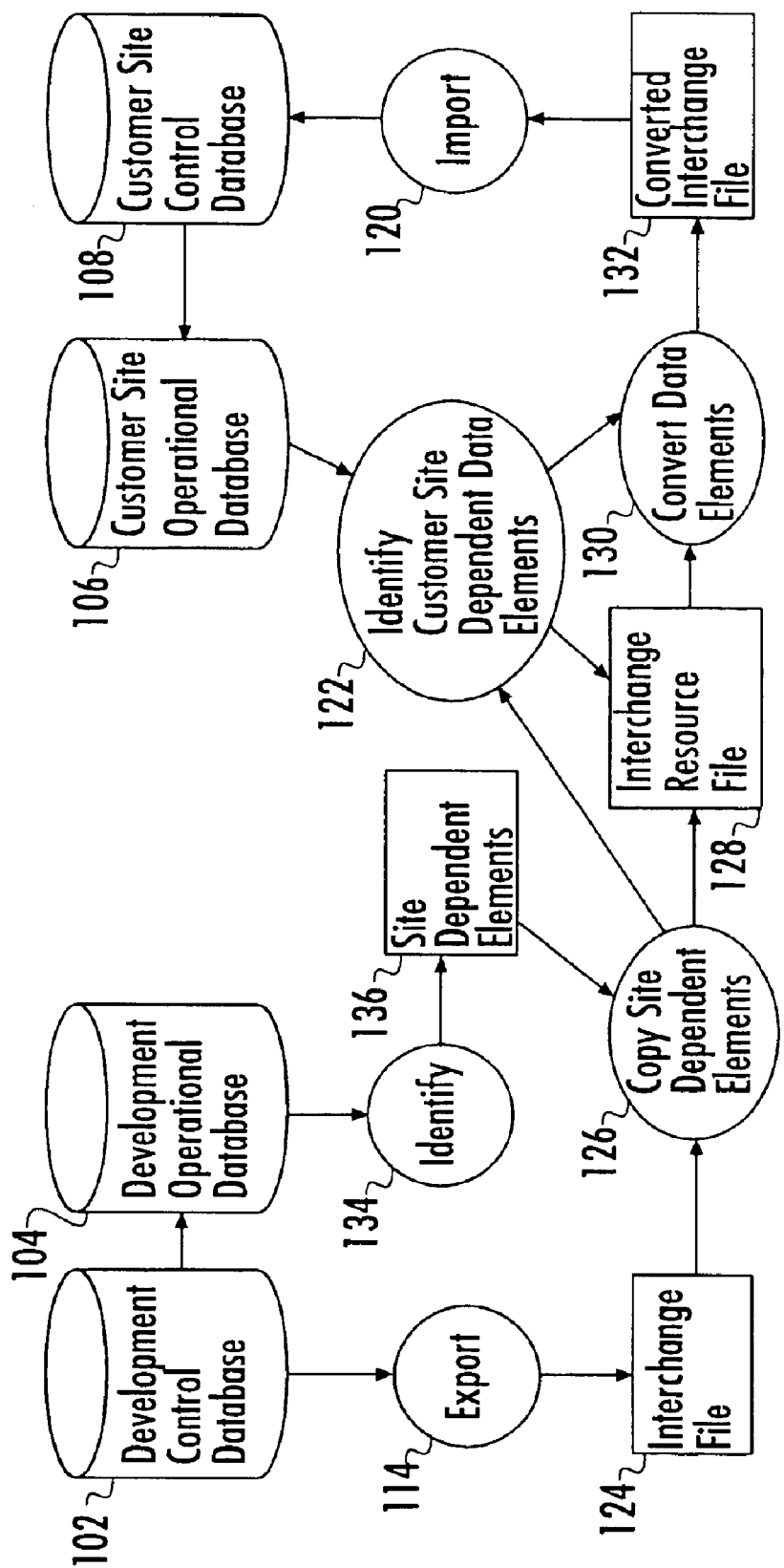
FIG. 1 is a process flow diagram illustrating typical exemplary embodiments of the present invention.

The present invention is described to a large extent in this specification in terms of methods for deploying predefined data warehouse process models. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the following terms are used as defined here. Other terms are defined elsewhere in the specification and used as defined.

In this specification, the terms "field," "data element," and "attribute" are used as synonyms, referring to individual elements of digital data. Aggregates of data elements are referred to as "records" or "data structures." Aggregates of records are referred to as "tables" or "files." Aggregates of tables or files are referred to as "databases." Definitions of complex data structures that include member methods, functions, or software routines in addition to data elements are referred to as "classes." Instances of complex data structures are referred to as "objects" or "class objects."

"Data warehouse process model" is a metadata system which contains definitions of warehouse sources and targets, user defined transformations for tables and fields, a set of warehouse processes for data transformation and movement, and the flow and schedule of process execution. A warehouse process comprises a series of steps for data transformation and movement.

"Environment," in this specification, refers to the state of a data warehouse process model as indicated by data elements, environment parameters, whose values fulfill that purpose. Environment parameters include database names, authorized login user names, table schema, and so on. In this sense, the term "environment" is used slightly differently in this specification than in computer technology generally. In this specification, "environment" refers to an environment of a data warehouse process model rather than to the environment of a computer system generally. "Environment," as the term is used generally in computer technology, refers to the state of a computer as such rather than a data warehouse model. The state of a computer is usually determined, for example, by which programs are running on it and by the computer's basic hardware and software characteristics. For example, when one speaks of running a program in a UNIX environment, it means running a program on a computer that has the UNIX operating system. Many operating systems support choices of command prompt or a default command path. Such parameters taken together are said to constitute an environment. Similarly, in this specification, the set of data warehouse environment parameters taken together are said to comprise an "environment." In this sense, a development system has, for a data warehouse model defined upon it, a development environment, and a customer system has a customer environment. It is a principal technical subject of this specification that a development environment and a target customer environment are different.

A "schema" is a grouping or collection identifier for a set of database objects, including, for example, tables, views, user-defined functions, stored-procedures, sequences, synonyms, indexes, clusters, database links, snapshots, and packages, and so on. A schema is a collection of database objects. Schema typically are owned by individuals, and an owner controls access to data and objects within a schema. A schema is also a database object. Schemas in some circumstances are created automatically, such as when a first object in a schema is created. Such a first object is anything qualified by a schema name, such as a table, index, view, package, distinct type, function, trigger, and so on.

In many embodiments, a "schema name" is used as the first part of a two-part object name. When an object is created, it can be assigned to a specific schema. If no schema is expressly assigned for a new object, the new object is typically assigned to a default schema, which is typically the user ID of the person who created the object. The second part of the two part object name is the name of the object itself. For example, a user named Smith might have a table named SMITH.PAYROLL.

"Data format" as the term in used in this specification refers to the structure of a database system. Data formats typically are in a formal language or in metadata supported by a database management system. Data formats typically define tables, fields in tables, and relationships between fields and tables. Data formats typically are stored in data dictionaries. Although data formats often are defined in text database language, the term is often used also to refer to graphical depictions of database structures. In this specification, we distinguish data formats and data schema. Schema are collections of database objects. Data formats are definitions of database objects and descriptions of relations among database objects.

Detailed Description

In this disclosure, improved means and methods of warehouse model deployment are presented. The improved approach successfully deploys pre-build warehouse models to multiple operations sites with different site and language environments. Although many of the examples in this disclosure are given in terms of IBM's DB2 Data Warehouse Center and Data Warehouse Manager, in fact, the means and methods disclosed are useful in the environments of many warehouse management and deployment systems, including particularly those that use interchange metadata formats like tag files or other metadata exchange files in text format.

This disclosure views the deployment problem generally as involving three main development and installation periods: (1) Development of the Predefined Warehouse Process Models (2) Prepare for Deployment, and, (3) Customized Setup. Developing the predefined warehouse process model is viewed as including identifying site dependent information, Identifying language dependent information, and Building a predefined warehouse process model with particular attention to the format of data elements that tend to be site dependent.

Preparing for deployment is viewed as including Exporting metadata to an Interchange metadata file and Extracting language related information for translation.

Customized setup is viewed as including detecting site related information in the customer site, converting the interchange metadata file to conform to the requirements of the customer site, and importing the converted interchange metadata file into the customer system.

Turning now to FIG. 1, an exemplary embodiment of the invention is shown as a method of deploying a predefined data warehouse process model from a development system to a customer system. The example development system has a development environment, and the customer system has a customer environment. The customer environment is different from the development environment. Exemplary embodiments typically include exporting (114) metadata from the predefined warehouse process model to an interchange metadata file (124), where the metadata includes data elements describing a development environment, and the metadata includes at least some data elements with values that are site dependent.

Exporting (114) metadata from the predefined warehouse process model to an interchange metadata file (124), in the example of IBM's DB2 Data Warehouse Center, includes exporting the metadata into an interchange metadata file format implemented in a tag language. The tag language of IBM's DB2 Data Warehouse Center ("the DWC tag language"), examples of which are set forth in Appendix I, like some other export functions, makes no particular provision for identifying site dependent data elements in exported metadata. Another example of an interchangeable file format implemented in a tag language, making no particular provision for identifying site dependent data elements in exported metadata as such, is the format of the Common Warehouse Model ("CWM"), implemented by use of the eXtended Markup Language ("XML"), an example of which is set forth in Appendix II. In this kind of embodiment, where the export function and the tag language formatting the interchange data file make no particular provision for identifying site dependent data elements, site dependent data elements including language dependent data elements often are identified and copied out of the interchange metadata file by viewing the interchange metadata file in an application, such as a word processor, and exercising copy and paste operations to copy site dependent data elements into a resource file.

Still other embodiments utilize other tag languages, tag languages capable of indicating site dependent or language dependent data elements, such as for example, other embodiments based on XML, to identify site dependent elements, as illustrated by the following tag language pseudocode:

```
<table>
    tablename="table 1"
        <data element>
            dataElementName="Field One"
            dataElementValue="XYZ"
            dataElementSiteDependent="True"
        </data element>
        <data element>
            dataElementName="Field Two"
            dataElementValue="123"
            dataElementLanguageDependent="True"
        </data element>
</table>
```

Some embodiments that use tag languages capable of indicating site dependent or language dependent data elements include software routines that scan the interchange metadata file for data elements indicated as site dependent or language dependent and copy those data elements to a resource file such as an interchange resource file or a translation resource file. Such embodiments typically have the advantage of being more amenable to full automation than embodiments that have no provision within the interchange metadata file itself for identifying site dependent or language dependent data elements.

Deploying predefined warehouse models to multiple customer sites having site dependent variations in metadata models, including language dependent variations in metadata models, typically includes particular planning, including for example, identifying site dependent information. In the example of the DB2 Data Warehouse Center, examples of site dependent information include, for the extraction source database, the database name, the database login user name, and the database table schema. For the extraction target database, examples of site dependent information include the database name, the database login user name, and the database table schema. Other example site dependent data elements include, for example, system environment variables.

Embodiments typically include copying (126), from the interchange metadata file to an interchange resource file (128), site dependent data elements, identifying (122) site dependent data values of the customer system, and converting (130), in the interchange metadata file (132), the site dependent data element values to the site dependent data values of the customer system.

More specifically, in addition to identifying and copying to an interchange resource file the site dependent data elements, typical embodiments include the actual values from the customer environment of the site dependent elements or site dependent parameters. In addition, the pre-identified site dependent parameter values in typical embodiments generally are allocated from the customer site before the tag file is loaded into the customer site warehouse control database. More specifically, it is typical in embodiments of the present invention to convert to customer environment values the site dependent parameters in the interchange resource file.

The language environment information, the language of the customer site, also is obtained at this time in typical embodiments, to determine which language version of the translation resource file is to be used to convert the language dependent data elements of the interchange metadata file.

Embodiments of the kind illustrated typically include converting (130), in the interchange metadata file (132), the site dependent data element values to the site dependent data values of the customer system. More specifically, exemplary embodiments carry out the conversion of the site dependent data element values as illustrated in the following example pseudocode:

```
Define array old_str[i] for storing development site information
Set development site dependent strings into old_str[i]
Defined array new_str[i] for storing customer site information
Set corresponding customer site strings into new_str[i]
If customer site has different language environment
    Set language specific information to both old_str[i] and new_str[i]
Open default Tag File for read (file_in)
Open a new file for writing the converted file (file_out)
For each line in file_in (a_line)
    If a_line is a comment line or empty line
        Write a_line back to file_out
    Else
        If a_line contains any string in old_str[i]
            For each string in old_str[i]
                If old_str[i] exists in a_line
                    Replace all old_str[i] with new_str[i]
                End if
            End for
            Write replaced a_line back to file_out
        Else
            Write a_line back to file_out
        Endif
    Endif
End for
Close file file_out
Close file fine_in
```

Exemplary embodiments also include importing (120) the interchange metadata file into the customer system. The import function is typically a software routine provided as part of the data warehouse management system in the customer environment.

As mentioned, typical example embodiments include identifying (134) site dependent data elements (136), more specifically, for example, site dependent data elements in the development environment. The site dependent data elements so identified typically comprise the site dependent data elements to be extracted or copied into an interchange resource file. Some data warehouse metadata schema make no provision for identifying site dependent data elements. Inn such systems, where the metadata schema itself does not identify site dependent data elements, site dependent data elements including language dependent data elements often are identified simply by inspecting the system parameters of the source and target databases and observing the ones that change from environment to environment. Thereafter, as mentioned above, in such embodiments it is typical to copy such data elements out of the interchange metadata file by viewing the interchange metadata file in an application, such as a word processor, and exercising copy and paste operations to copy site dependent data elements into a resource file.

Figure 2:
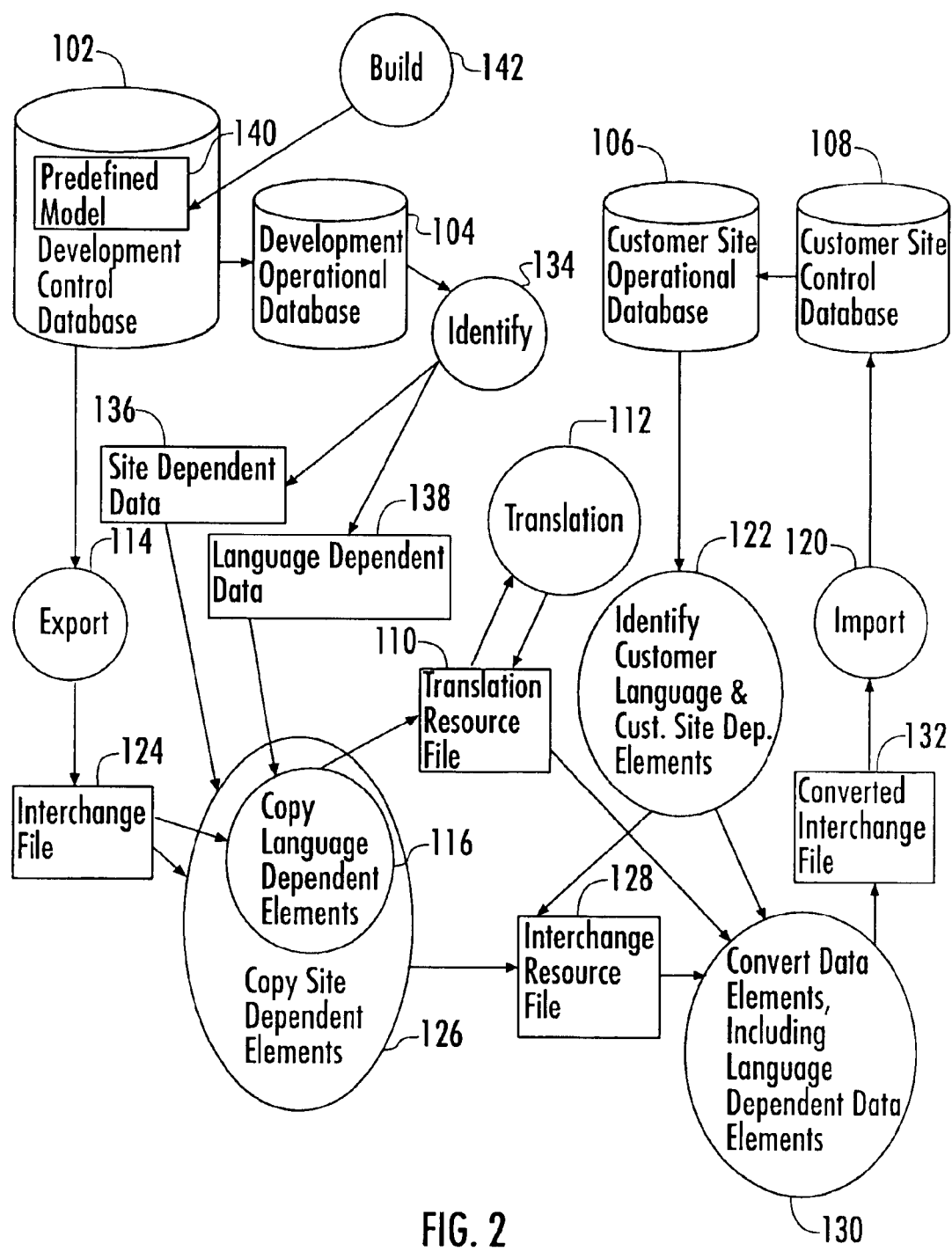
FIG. 2 is a process flow diagram illustrating more detailed typical exemplary embodiments of the present invention.

In exemplary embodiments of the kind illustrated in FIG. 2, the site dependent data elements include language dependent data elements, and identifying (134) site dependent data elements (136) includes identifying language dependent data elements (138). In many embodiments, the language dependent information is copied into a translation resource file. The translation resource file in some embodiments, for example, uses a so-called 'Java property file format,' because most translation tools recognize this Java property file format. In such embodiments, the translation resource file typically is sent to a translation center, an automated language translation service, and translated into the different languages the product is planned to support. It is usual in such example embodiments, after the data elements for translation are identified and copied to the translation resource file to translate the language dependent data elements into several languages at the same time and store the several languages back in the translation resource file. In this way, when the language for a customer site is identified, the translation for the language dependent data elements is already available in the translation resource file. In such embodiments, the actual process of converting the language dependent elements in the interchange metadata file is to scan the interchange metadata file for lines containing language dependent data elements, substituting a translation from the translation resource file for the language dependent data element in the interchange metadata file.

It is useful in typical embodiments to take certain precautions in building predefined warehouse process models for deployment among customer sites having site dependent data elements. Exemplary embodiments typically include building (142) the predefined warehouse process model (140) with unique names for site dependent data elements and with unique names for databases, database users, and table schemas. It is also useful in various embodiments to select table schema names that are likely to be unique with respect to customer database table schema names.

In some embodiments, copying (126), from the interchange metadata file to an interchange resource file, site dependent data elements typically includes copying (116) language dependent data elements from the interchange metadata file into a translation resource file (110). Embodiments typically include translating (112) the language dependent data elements into one or more customer languages and recording the translations in related fields in the translation resource file (110). In exemplary embodiments, identifying (122) site dependent data values of the customer system typically includes identifying a customer language of the customer system, and converting (130), in the interchange metadata file, the site dependent data element values to the site dependent data values of the customer system typically includes converting language dependent data elements to the customer language of the customer site.

To support internationalization of a product, data warehouse information typically is displayed to end users translated into the customer language environment, and the product is typically able to operate in several supported language environments. For the warehouse processes models, developed the development language environment, the language specific information is converted to different languages. For the warehouse system models built with DB2 Data Warehouse Center ("DWC"), for example, the language specific information typically includes the names of a set of default DWC objects, which includes 'Default DWC User', 'Default Security Group', and 'Default DWC AgentSite'. In various embodiments, language specific data elements include, for example, warehouse process names, process step names, and warehouse subject names. An "AgentSite" object carries connection information to a machine where a warehouse agent deamon is running. The 'Default DWC AgentSite' is a system predefined AgentSite which runs on the warehouse server machine on the NT/W2K system only. A "warehouse subject" is a group of warehouse process with similar means. A warehouse typically has multiple warehouse subjects defined. Warehouse subjects typically contain multiple warehouse processes. Warehouse process typically contain multiple process steps.

FIG. 2 is now used as the basis for the discussion of a use case for a deployment in which site dependent data elements include language dependent data elements. As illustrated in FIG. 2, typical embodiments of the invention include methods of deploying a predefined data warehouse process model (140) from a development system (102, 104) to a customer system (106, 108). The development system (102, 104) has a development environment, and the customer system (106, 108) has a customer environment. The customer environment is different from the development environment.

The illustrated exemplary embodiment includes identifying (134) data elements having values that are site dependent (136), identifying (134) data elements having values that are language dependent (138), and building (142) the predefined warehouse process model with unique names for site dependent data elements and with unique names for databases, database users, and table schemas. Embodiments of the kind illustrated typically include exporting (114) metadata from the predefined warehouse process model to an interchange metadata file (124), in which the metadata includes data elements describing a development environment, in which the metadata includes at least some data elements having values that are site dependent.

Embodiments of this kind typically include copying (116), from the interchange metadata file (124) into a translation resource file (110), the language dependent data elements (138), and copying (126), from the interchange metadata file (124) to an interchange resource file (128), the site dependent data elements (136). Such embodiments include translating (112) the language dependent data elements into one or more customer languages and recording the translations in related fields in the translation resource file (110). Such embodiments include identifying (122) a customer language of the customer system, and identifying (122) site dependent data values of the customer system. Such embodiments typically include converting (130) language dependent data elements to the customer language of the customer site, that is, converting, in the interchange metadata file, in dependence upon the contents of the translation resource file, the customer language, and the contents of the interchange resource file, the site dependent data element values, including the language dependent data elements, to the site dependent data values of the customer system, and importing (120) the interchange metadata file into the customer system.

The improved approach extends the portability of predefined warehouse processes model to multiple site and multiple language environments. Only a single copy of the predefined process model is needed for distribution. The model can be dynamically modified while installed to the new site before it is imported to the warehouse control database in the new site. The improved approach extends the application area for warehouse related systems from system specific applications to a development tool which can build portable warehouse processes across different systems with different languages. This approach can be applied to any interchangeable warehouse metadata represented in tag language or other formats where the related site dependent and language dependent data elements or parameters can be identified and replaced.

It will be understood from the foregoing description that various modifications and changes may be made in the exemplary embodiments of the present invention without departing from its true spirit. The descriptions in this specification are for purposes of illustration only and should not be construed in a limiting sense. The scope of the present invention should be limited only by the language of the following claims.

APPENDIX I

This Appendix I sets forth an example of IBM Information Catalog Tag Language, an exemplary tag language for use in interchange metadata files.

```
:DISHCNTL.SEQUENCE(1,-)
:COMMENT.SYSTEM(V7.2.0)
:COMMENT.
:COMMENT. DB2 Universal Database 7.2
:COMMENT. Source Database name: wcactrl
:COMMENT.   Output   File   name:
  H:\wcatest\export\expxl\TestMartt.tag
:COMMENT. Time Nov. 20, 2001 17:21:19
:COMMENT.
:COMMENT. Start Process export
:COMMENT. Exporting Process Test Process
:COMMENT.
:COMMENT. Begin INFOGRPS Instance
:COMMENT.
:ACTION.OBJINST(MERGE)
:OBJECT.TYPE(INFOGRPS)
:INSTANCE.
   NAME(New Subject area)
   CONTACT(Default DWC User)
:COMMENT.
:COMMENT. End INFOGRPS Instance
:COMMENT.
:COMMIT.CHKPID(10)
:COMMENT.
:COMMENT. Begin IWHSCGRP Instance
:COMMENT.
:ACTION.OBJINST(MERGE)
:OBJECT.TYPE(IWHSCGRP)
:INSTANCE.
   NAME(Default Security Group)
   SHRTDESC(This is the default Data Warehouse Center
      Security Group created by the Data Warehouse Center
      product.)
:COMMENT.
:COMMENT. End IWHSCGRP Instance
:COMMENT.
:COMMENT.
:COMMENT. Begin IWHUFUNC Instance
:COMMENT.
:ACTION.OBJINST(MERGE)
:OBJECT.TYPE(IWHUFUNC)
:INSTANCE.
   NAME(UFAdministration)
   SHRTDESC(Administration)
:COMMENT.
:COMMENT. End IWHUFUNC Instance
:COMMENT.
:COMMENT.
:COMMENT. Relation: IWHSCGRP to IWHUFUNC
:COMMENT.
:ACTION.RELATION(ADD)
:RELTYPE.TYPE(CONTAIN)  SOURCETYPE
   (IWHSCGRP) TARGETYPE(IWHUFUNC)
:INSTANCE.
   SOURCEKEY(NAME(Default Security Group))
   TARGETKEY(NAME(UFAdministration))
:COMMENT.
:COMMENT.
:COMMENT. Begin IWHUFUNC Instance
:COMMENT.
:ACTION.OBJINST(MERGE)
:OBJECT.TYPE(IWHUFUNC)
:INSTANCE.
   NAME(UFOperations)
   SHRTDESC(Operations)
:COMMENT.
:COMMENT. End IWHUFUNC Instance
:COMMENT.
:COMMENT.
:COMMENT. Relation: IWHSCGRP to IWHUFUNC
:COMMENT.
:ACTION.RELATION(ADD)
```

:RELTYPE.TYPE(CONTAIN) SOURCETYPE
(IWHSCGRP) TARGETYPE(IWHUFUNC)
:INSTANCE.
  SOURCEKEY(NAME(Default Security Group))
  TARGETKEY(NAME(UFAdministration))
:COMMIT.CHKPID(20)
:COMMENT.
:COMMENT. Begin PROCESS Instance
:COMMENT.
:ACTION.OBJINST(MERGE)
:OBJECT.TYPE(PROCESS)
:INSTANCE.
  NAME(Test Process)
  CONTACT(Default DWC User)
  PRCTYPE(1)
:COMMENT.
:COMMENT. End PROCESS Instance
:COMMENT.
:COMMENT.
:COMMENT. Relation: INFOGRPS to PROCESS
:COMMENT.
:ACTION.RELATION(ADD)
:RELTYPE.TYPE(CONTAIN) SOURCETYPE
(INFOGRPS) TARGETYPE(PROCESS)
:INSTANCE.
  SOURCEKEY(NAME(New Subject area))
  TARGETKEY(NAME(Test Process))
:COMMENT.
:COMMENT.
:COMMENT. Relation: PROCESS to IWHSCGRP
:COMMENT.
:ACTION.RELATION(ADD)
:RELTYPE.TYPE(LINK) SOURCETYPE(PROCESS)
  TARGETYPE(IWHSCGRP)
:INSTANCE.
  SOURCEKEY(NAME(Test Process))
  TARGETKEY(NAME(Default Security Group))
:COMMENT.
:COMMENT.
:COMMENT. Begin IWHAGENT Instance
:COMMENT.
:ACTION.OBJINST(MERGE)
:OBJECT.TYPE(IWHAGENT)
:INSTANCE.
  NAME(Default DWC AgentSite)
  SHRTDESC(Default AgentSite created by the Data Warehouse Center product to represent the Data Warehouse Center Server.)
  AGTOSTY(1)
  AGTMODNM(IWH2AGNT)
:COMMENT.
:COMMENT. End IWHAGENT Instance
:COMMENT.
:COMMIT.CHKPID(30)
:COMMENT.
:COMMENT. Begin DATABASE Instance
:COMMENT.
:ACTION.OBJINST(MERGE)
:OBJECT.TYPE(DATABASE)
:INSTANCE.
  NAME(New Target)
  DBNAME(wcamart)
  DBTYPE(1)
  DBETYPE(11)
  ISWH(Y)
  USERID(martuser)
  CONTACT(Default DWC User)
  USEODBC(N)
  CODEPAGE(437)
  VERSION(07.02.0002)
  DBMSSERV(DB2)
  DFLTDEL('')
  WEBDBTYP(-1)
:COMMENT.
:COMMENT. End DATABASE Instance
:COMMENT.
:COMMENT.
:COMMENT. Relation: DATABASE to IWHAGENT
:COMMENT.

APPENDIX II

This Appendix II sets forth an example of Common Warehouse Model Tag Language, an exemplary tag language for use in interchange metadata files.

<?xml version="1.0" encoding="UTF-8"?>
<!DOCTYPE XMI SYSTEM "cwm.dtd"[
<!ELEMENT ixafs (ixaftv)+>
<!ATTLIST ixafs
  n CDATA #REQUIRED
>
<!ELEMENT ixaftv EMPTY>
<!ATTLIST ixaftv
  t CDATA #REQUIRED
  v CDATA #REQUIRED
>]>
<XMI xmi. version="1.1" timestamp="Tue Nov 20 17:19:39 CST 2001"
xmlns:CWM="org.omg.CWM1.0/Foundation"
  xmlns:UML="org.omg.UML1.3"
xmlns:CWMWHP="org.omg.CWM1.0/WarehouseProcess"
xmlns:CWMTFM="org.omg.CWM1.0/Transformation"
xmlns:CWMRDB="org.omg.CWM1.0/Relational">
  <XMI.header>
  <XMI.documentation>
  <XMI.exporter>XMI Application Framework</XMI.exporter>
  <XMI.exporterVersion>1.15</XMI.exporterVersion>
  <XMI.documentation>
  <XMI.header>
  <XMI.content>
  <CWM:SoftwareSystem xmi id="_1" name="DWC">
  <UML:Namespace.ownedElement>
  <UML:Component xmi.id="_1.1" name="IWH2AGNT" namespace="_1"/>
  </UML:Namespace.ownedElement>
  </CWM:SoftwareSystem>
  <UML:Class xmi.id="_2" name="Not available">
  <UML:Classifier.feature>
  <UML:Attribute xmi.id="_2.1" name="Not available"/>
  <UML:Classifier.feature>
  </UML:Class>
  <UML:DataType xmi.id="_3" name="1"/>
  <UML:DataType xmi.id="_4" name="2"/>
  <UML:DataType xmi.id="_5" name="3"/>
  <CWM:ResponsibleParty xmi.id="_6" name="Default DWC User"

```
modelElement="__1"/>
  <UML:Package xmi.id="__7" name="New Subject
     area">
  <UML:Namespace.ownedElement>
  <CWMWHP:WarehouseProcess xmi.id="__7.1" name=
     "Test Process"
namespace="__7" clientDependency="__19__20"
  transformationActivity="__21">
  <UML:ModelElement.taggedValue>
  <UML:TaggedValue xmi.id="__7.1.1" tag=
     "PROCESSTYPE" value="1"
modelElement="__7.1"/>
  </UML:ModelElement.taggedValue>
  </CWMWHP:WarehouseProcess>
  </Namespace.ownedElement>
  </Package>
  <CWM:ResponsibleParty xmi.id="__8" name="Default
     DWC User"
modelElement="__7.1"/>
  CWMRDB:Catalog xmi.id="__9" name="wcamart">
  <UML:ModelElement.taggedValue>
  <UML:TaggedValue xmi.id="__9.1" tag="IRNAME"
     value="New Target"
modelElement="__9"/>
  <UML:TaggedValue xmi.id="__9.2" tag="ISWH" value=
     "Y"
modleElement="__9"/>
  <UML:TaggedValue xmi.id="__9.3" tag="USERID"
     value="martuser"
modelElement="__9"/>
  <UML:TaggedValue xmi.id="__9.4" tag="USEODBC"
     value="N"
modelElement="__9"/>
  <UML:TaggedValue xmi.id="__9.5" tag="CODEPAGE"
     value="437"
modelElement="__9"/>
  <UML:TaggedValue xmi.id="__9.6" tag=
     "VERSION"value="07.02.0002"
modelElement="__9"/>
  <UML:TaggedValue xmi.id="__9.7" tag="DBMDEL"
     value="""
modelElement="__9"/>
  </UML:ModelElement.taggedValue>
  <UML:Namespace.ownedElement>
  <CWMRDB:Schema xmi.id="__9.8" name=
     "WCAMNG" namespace="__9">
  <UML:Namespace.ownedElement>
  <CWMRDB:BaseTable xmi.id="__9.8.1" name=
     "RANGE__CTGY"
namespace="__9.8" supplierDependency="__19">
  <UML:ModelElement.taggedValue>
  <UML:TaggedValue xmi.id="__9.8.1.1" tag=
     "TBLISBIN" value="N"
modelElement="__9.8.1"/>
  <UML:TaggedValue xmi.id="__9.8.1.2" tag=
     "CREATYPE" value="2"
modelElement="__9.8.1"/>
  <UML:TaggedValue xmi.id="__9.8.1.3" tag=
     "TBALLAS" value="N"
modelElement="__9.8.1"/>
  <UML:TaggedValue xmi.id="__9.8.1.4" tag=
     "IWHDRATN" value="Y"
modelElement="__9.8.1"/>
  <UML:TaggedValue xmi.id="__9.8.1.5" tag=
     "IWHMAXED" value="0"
modelElement="__9.8.1"/>
  <UML:TaggedValue xmi.id="__9.8.1.6" tag=
     "IWHCREGN" value="Y"
modelElement="__9.8.1"/>
  <UML:TaggedValue xmi.id="__9.8.1.7" tag=
     "IWHCRERU" value="CREATE TABLE
     WCAMNG.RANGE__CTGY(RANGE__ID INTEGER
     NOT NULL, MIN__RANGE INTEGER, MAX__
     RANGE INTEGER, RANGE__DESC VARCHAR
     (32))" modelElement="__9.8.1"/>
  <UML:TaggedValue xmi.id="__9.8.1.8" tag=
     "IWHCRTAR" value="N"
modelElement="__9.8.1"/>
  <UML:TaggedValue xmi.id="__9.8.1.9" tag=
     "IWHGRANT" value="Y"
modelElement="__9.8.1"/>
  <UML:TaggedValue xmi.id="__9.8.1.10" tag="IDSDIM"
     value="Y"
modelElement="__9.8.1"/>
  <UML:TaggedValue xmi.id="__9.8.1.11" tag=
     "IDSFACT" value="N"
modelElement="__9.8.1"/>
  <UML:TaggedValue xmi.id="__9.8.1.12" tag=
     "IDSREPL" value="N"
modelElement="__9.8.1"/>
  <UML:TaggedValue xmi.id="__9.8.1.13" tag=
     "PARTBSP" value="N"
modelElement="__9.8.1"/>
  </UML:ModelElement.taggedValue>
  <UML:Classifier.feature>
  <CWMRDB:Column xmi.id="__9.8.1.14" name=
     "RANGE__ID" length="0"
scale="0" precision="0" isNullable="columnNoNulls"
  owner="__9.8.1" type="__17">
  <UML:ModelElement.taggedValue>
  <UML:TaggedValue xmi.id="__9.8.1.14.1" tag=
     "ISTEXT" value="N"
modelElement="__9.8.1.14"/>
  <UML:TaggedValue xmi.id="__9.8.1.14.2" tag=
     "ORDINAL" value="1"
modelElement="__9.8.1.14"/>
  <UML:TaggedValue xmi.id="__9.8.1.14.3" tag=
     "EDTNCOL" value="N"
modelElement="__9.8.1.14"/>
  </UML:ModelElement.taggedValue>
  </CWMRDB:Column>
  <CWMRDB:Column xmi.id="__9.8.1.15" name="MIN__
     RANGE"
length="0" scale="0" precision="0" isNullable=
  "columnNullable"owner="__9.8.1"
type="__17">
  <UML:ModelElement.taggedValue>
  <UML:TaggedValue xmi.id="__9.8.1.15.1" tag=
     "ISTEXT" value="N"
modelElement="__9.8.1.15"/>
  <UML:TaggedValue xmi.id="__9.8.1.15.2" tag=
     "ORDINAL" value="2"
modelElement="__9.8.1.15"/>
  <UML:TaggedValue xmi.id="__9.8.1.15.3" tag=
     "EDTNCOL" value="N"
```

```
modelElement="_9.8.1.15"/>
  </UML:ModelElement.taggedValue>
  </CWMRDB:Column>
  <CWMRDB:Column xmi.id="_9.8.1.16" name=
    "MAX_RANGE"
length="0" scale="0" precision="0" isNullable=
"columnNullable" owner="_9.8.1"
type="_17">
  <UML:ModelElement.taggedValue>
  <UML:TaggedValue xmi.id="_9.8.1.16.1" tag=
    "ISTEXT" value="N"
modelElement="_9.8.1.16"/>
  <UML:TaggedValue xmi.id="_9.8.1.16.2" tag=
    "ORDINAL" value="3"
modelElement="_9.8.1.16"/>
  <UML:TaggedValue xmi.id="_9.8.1.16.3" tag=
    "EDTNCOL" value="N"
modelElement="_9.8.1.16"/>
  </UML:ModelElement.taggedValue>
  </CWMRDB:Column>
  <CWMRDB:Column xmi.id="_9.8.1.17" name=
    "RANGE_DESC"
length="32" scale="0" precision="32" isNullable=
"columnNullable" owner="_9.8.1"
type="_18">
  <UML:ModelElement.taggedValue>
```

What is claimed is:

1. A method of deploying a predefined data warehouse process model from a development system having a development environment to a customer system having a customer environment, the customer environment being different from the development environment, the method comprising the steps of:
   exporting metadata from the predefined warehouse process model to an interchange metadata file, wherein the metadata comprises data elements describing a development environment, wherein the metadata comprises at least some data elements having values that are site dependent;
   copying, from the interchange metadata file to an interchange resource file, site dependent data elements;
   identifying site dependent data values of the customer system;
   converting, in the interchange metadata file, the site dependent data element values to the site dependent data values of the customer system; and
   importing the interchange metadata file into the customer system.

2. The method of claim 1 further comprising identifying site dependent data elements.

3. The method of claim 2 wherein:
   the site dependent data elements include language dependent data elements, and
   identifying site dependent data elements includes identifying language dependent data elements.

4. The method of claim 1 further comprising building the predefined warehouse process model with unique names for site dependent data elements and with unique names for databases, database users, and table schemas.

5. The method of claim 1 wherein:
   copying, from the interchange metadata file to an interchange resource file, site dependent data elements further comprises copying, from the interchange metadata file into a translation resource file, language dependent data elements;
   the method further comprises translating the language dependent data elements into one or more customer languages and recording the translations in related fields in the translation resource file;
   identifying site dependent data values of the customer system further comprises identifying a customer language of the customer system; and
   converting, in the interchange metadata file, the site dependent data element values to the site dependent data values of the customer system further comprises converting language dependent data elements to the customer language of the customer site.

6. A method of deploying a predefined data warehouse process model from a development system having a development environment to a customer system having a customer environment, the customer environment being different from the development environment, the method comprising the steps of:
   identifying data elements having values that are site dependent;
   identifying data elements having values that are language dependent;
   building the predefined warehouse process model with unique names for site dependent data elements and with unique names for databases, database users, and table schemas;
   exporting metadata from the predefined warehouse process model to an interchange metadata file, wherein the metadata comprises data elements describing a development environment, wherein the metadata comprises at least some data elements having values that are site dependent;
   copying, from the interchange metadata file into a translation resource file, the language dependent data elements;
   copying, from the interchange metadata file to an interchange resource file, the site dependent data elements;
   translating the language dependent data elements into one or more customer languages and recording the translations in related fields in the translation resource file
   identifying a customer language of the customer system;
   identifying site dependent data values of the customer system;
   converting language dependent data elements to the customer language of the customer site
   converting, in the interchange metadata file, in dependence upon the contents of the translation resource file, the customer language, and the contents of the interchange resource file, the site dependent data element values to the site dependent data values of the customer system; and
   importing the interchange metadata file into the customer system.

7. A system of deploying a predefined data warehouse process model from a development system having a development environment to a customer system having a customer environment, the customer environment being different from the development environment, the system comprising:
   means for exporting metadata from the predefined warehouse process model to an interchange metadata file, wherein the metadata comprises data elements describing a development environment, wherein the metadata comprises at least some data elements having values that are site dependent;

means for copying, from the interchange metadata file to an interchange resource file, site dependent data elements;

means for identifying site dependent data values of the customer system;

means for converting, in the interchange metadata file, the site dependent data element values to the site dependent data values of the customer system; and means for importing the interchange metadata file into the customer system.

8. The system of claim 7 further comprising means for identifying site dependent data elements.

9. The system of claim 8 wherein:

the site dependent data elements include language dependent data elements, and identifying site dependent data elements includes means for identifying language dependent data elements.

10. The system of claim 7 further comprising means for building the predefined warehouse process model with unique names for site dependent data elements and with unique names for databases, database users, and table schemas.

11. The system of claim 7 wherein:

means for copying, from the interchange metadata file to an interchange resource file, site dependent data elements further comprises means for copying, from the interchange metadata file into a translation resource file, language dependent data elements;

the system further comprises means for translating the language dependent data elements into one or more customer languages and means for recording the translations in related fields in the translation resource file;

means for identifying site dependent data values of the customer system further comprises means for identifying a customer language of the customer system; and means for converting, in the interchange metadata file, the site dependent data element values to the site dependent data values of the customer system further comprises means for converting language dependent data elements to the customer language of the customer site.

12. A computer program product of deploying a predefined data warehouse process model from a development system having a development environment to a customer system having a customer environment, the customer environment being different from the development environment, the computer program product comprising:

a recording medium, means, recorded on the recording medium, for exporting metadata from the predefined warehouse process model to an interchange metadata file, wherein the metadata comprises data elements describing a development environment, wherein the metadata comprises at least some data elements having values that are site dependent;

means, recorded on the recording medium, for copying, from the interchange metadata file to an interchange resource file, site dependent data elements;

means, recorded on the recording medium, for identifying site dependent data values of the customer system;

means, recorded on the recording medium, for converting, in the interchange metadata file, the site dependent data element values to the site dependent data values of the customer system; and means, recorded on the recording medium, for importing the interchange metadata file into the customer system.

13. The computer program product of claim 12 further comprising means, recorded on the recording medium, for identifying site dependent data elements.

14. The computer program product of claim 13 wherein:

the site dependent data elements include language dependent data elements, and identifying site dependent data elements includes means, recorded on the recording medium, for identifying language dependent data elements.

15. The computer program product of claim 12 further comprising means, recorded on the recording medium, for building the predefined warehouse process model with unique names for site dependent data elements and with unique names for databases, database users, and table schemas.

16. The computer program product of claim 12 wherein:

means, recorded on the recording medium, for copying, from the interchange metadata file to an interchange resource file, site dependent data elements further comprises means, recorded on the recording medium, for copying, from the interchange metadata file into a translation resource file, language dependent data elements;

the computer program product further comprises means, recorded on the recording medium, for translating the language dependent data elements into one or more customer languages and means, recorded on the recording medium, for recording the translations in related fields in the translation resource file;

means, recorded on the recording medium, for identifying site dependent data values of the customer system further comprises means, recorded on the recording medium, for identifying a customer language of the customer system; and means, recorded on the recording medium, for converting, in the interchange metadata file, the site dependent data element values to the site dependent data values of the customer system further comprises means, recorded on the recording medium, for converting language dependent data elements to the customer language of the customer site.

* * * * *